United States Patent [19]
Horbez et al.

[11] Patent Number: 4,908,108
[45] Date of Patent: Mar. 13, 1990

[54] ELECTROLYTIC OXIDATION OF CERIUM 3+ VALUES TO CERIUM 4+ VALUES

[75] Inventors: Dominique Horbez, Nancy; Alain Storck, Jarvielle La Malgrange; Jean Grosbois, L'Isle Adam, all of France

[73] Assignee: Rhone-Poulenc Chimie, Courbevoie, France

[21] Appl. No.: 321,094

[22] Filed: Mar. 9, 1989

[30] Foreign Application Priority Data

Mar. 9, 1988 [FR] France ............................ 88 03021

[51] Int. Cl.⁴ .............................................. C25B 1/00
[52] U.S. Cl. ...................................... 204/93; 423/21.5
[58] Field of Search .......................... 204/93; 423/21.5

[56] References Cited
U.S. PATENT DOCUMENTS 4,676,957  6/1987  Martin et al. ...................... 423/21.5

Primary Examiner—John F. Niebling
Assistant Examiner—David G. Ryser
Attorney, Agent, or Firm—Burns, Doane, Swecker & Mathis

[57] ABSTRACT

Cerous 3+ values are converted into ceric 4+ values, in a conventional separator-free electrolytic cell, by emulsifying an organic phase containing a cerium 4+ extractant in an aqueous sulfuric phase which includes the cerium 3+ values to be converted; simultaneously electrolytically oxidizing the cerium 3+ values into cerium 4+ values in a zone of electrolysis including an anode and a cathode, whereby the cerium 4+ values formed are liquid/liquid extracted into the organic phase; separating the resulting emulsion into an aqueous phase and an organic phase enriched in cerium 4+ values; and recovering the enriched organic phase.

24 Claims, 1 Drawing Sheet

ELECTROLYTIC OXIDATION OF CERIUM 3+ VALUES TO CERIUM 4+ VALUES

BACKGROUND OF THE INVENTION

1. Field of the Invention:

The present invention relates to the electrochemical oxidation of cerium 3+ to cerium 4+, in emulsion, and, more especially, to the electrochemical oxidation of solutions of cerous sulfate.

2. Description of the Prior Art:

It is known to this art, from FR 2,570,087, to electrochemically oxidize cerium 3+ to cerium 4+ in a sulfuric medium.

The process described in this '087 patent is characterized in that, in a first circulation loop, the sulfuric solution is treated in a first anode compartment of an electrolytic cell comprising a first anode compartment and a cathode compartment separated therefrom by a first cationic membrane, and wherein a first fraction of the solution treated in said anode compartment is recycled back into said anode compartment; and that, in a second circulation loop, a second fraction of the solution is treated in a second anode compartment of said electrolytic cell, also separated from said cathode compartment by a second cationic membrane, and a portion of the solution treated in this manner is recycled into the second anode compartment and the remaining portion of the solution is separated as final product. An electrolyte is circulated in the cathode compartment, a portion of he electrolyte issuing from this compartment being combined with the solution circulating in the first loop, and the remaining portion is recycled into said cathode compartment.

The electrolytic cell thus comprises two anode compartments, a single cathode department situated between the two anode compartments, and two cationic membranes separating each of the anode compartments from the cathode compartment.

This type of apparatus makes it possible to obtain high "Faraday" yields and a high cerium 3+ conversion ratio.

However, use of such a cell is disadvantageous when solutions with a very low cerium 3+ concentration are treated, because the electrode face surfaces must be considerably increased in light of the low current density, such that the size of the installation becomes quite large.

SUMMARY OF THE INVENTION

Accordingly, to avoid the use of electrolytic cells of considerable size and fitted with separators, a major object of the present invention is the provision of an improved process for the electrochemical oxidation of cerium 3+ to cerium 4+ in an emulsion medium, comprising simultaneously electrochemically oxidizing cerium 3+ to cerium 4+ in an aqueous sulfuric phase and extracting the cerium 4+ thus formed into an organic cerium 4+ extraction phase emulsified in said aqueous phase; this enables, after separation of the phases, producing of an organic phase charged with cerium 4+ values.

The process of the present invention, which combines an electrochemical oxidation of the cerium 3+ values with a simultaneous selective extraction of the cerium 4+ values into an organic phase, makes it possible to realize a high degree of cerium 3+ conversion. The process of this invention is simple and only requires a conventional electrolytic cell without separators, while at the same time providing large electrode specific surfaces.

DETAILED DESCRIPTION OF THE PREFERRED EMBODIMENTS OF THE INVENTION

Figure 1:
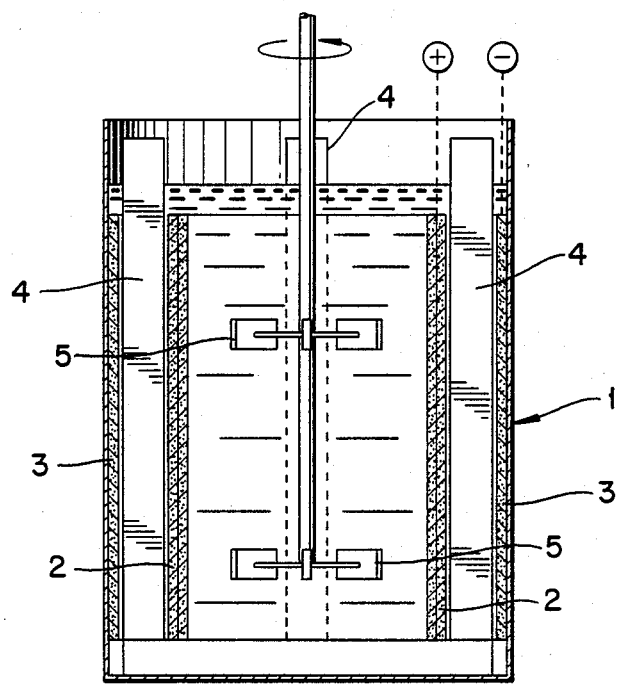
FIG. 1 is a front elevational cross-sectional view of suitable electrolytic cell for carrying out the process according to the invention.

More particularly according to the present invention, it has now unexpectedly and surprisingly been discovered that the extraction of cerium 4+ values into an organic phase results in conversion proportions hitherto impossible utilizing conventional electrolytic cells without separators.

Furthermore, the process of this invention, whereby the cerium 4+ present in a dispersed and electrochemically inert organic phase, makes it possible to eliminate a major disadvantage of use of electrolytic cells which are not equipped with separators. Namely, the possible reduction, at the cathode, of the product formed at the anode.

According to the present invention, the starting material is an aqueous phase comprising an aqueous acid solution of cerous sulfate.

Such solution may be prepared from an anhydrous or hydrated cerous sulfate salt. Its concentration depends on the solubility of the cerous sulfate.

It is possible to use an aqueous solution having a concentration ranging from 0.05 mole/liter to the concentration, at saturation, of the cerous sulfate in solution at the selected operating temperature.

The lower limit of concentration is not critical, but a very low concentration results in a weaker current density.

For example, the concentration of the cerous sulfate in solution at a temperature of from 20° C. to 25° C. advantageously ranges from 0.1 mole to 0.25 mole/liter, but in order to increase the current density at the anode, it is preferable to have a maximum cerous sulfate concentration which, consequently, is higher than or equal to 0.2 mole/liter.

Sulfuric acid is added in an amount such that the normality of the aqueous phase ranges from 0.5 to 5 N and preferably from 1 to 2 N. The concentration of the initial sulfuric acid is not critical and both dilute or concentrated sulfuric acid may be used.

The order of the mixing of the cerium 3+ salt and the sulfuric acid is also not critical.

The above defined aqueous phase is contacted with an organic phase containing an extraction agent for cerium 4+ that is insoluble in water.

The extraction agent, or extractant, used in the process of the invention must be capable of selectively extracting cerium 4+.

A cationic extractant, and, more particularly, an organophosphoric acid may be used.

Exemplary such extractants are those having the following general formulae:

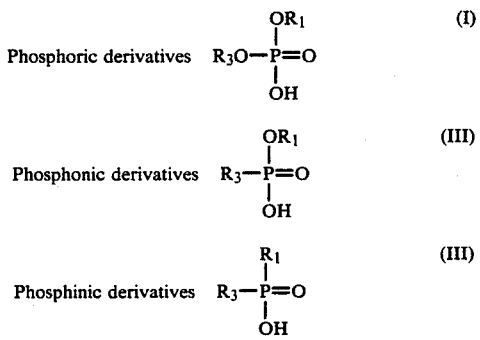

wherein $R_3$ represents $R_2$ or a hydrogen atom and $R_1$ and $R_2$ are aliphatic, cycloaliphatic and/or aromatic hydrocarbon radicals.

Such hydrocarbon radicals may contain from 1 to 18 carbon atoms and at least one contains at least 4 carbon atoms.

It is preferred to use mono- or dialkylphosphoric, mono- or dialkylphosphonic, alkylphenylphosphonic, mono- or dialkylphosphinic acids.

Even more preferably, di-(2-ethylhexyl)phosphoric and di-(2-ethylhexyl)phosphonic acids are used.

All of the aforesaid extractants may be used either alone or as mixtures thereof.

The organic phase may optionally contain an organic diluent inert relative to the extraction agents, in order to improve the hydrodynamic properties of the organic phase. Numerous organic solvents or their mixtures may be used as diluents. However, in the present case it is necessary to select a diluent that is not oxidized by cerium 4+.

Exemplary thereof are the aliphatic or cyclo-aliphatic hydrocarbons and halogenated hydrocarbons, or mixtures thereof.

Preferably, aliphatic hydrocarbons, such as, for example, hexane, heptane, dodecane, or petroleum fractions of the kerosene or isoparaffin type, are used.

The proportion of the extractant in the organic phase is not critical and may vary over broad limits. However, it is generally advantageous that it be as high as possible. Thus, in the case of cationic extractants, a concentration of the extraction agent of from 0.5 to 2.0 moles per liter of the organic phase imparts advantageous hydrodynamic conditions to the separation.

The aqueous phase and the organic phase are contacted with each other by emulsifying the organic phase in the aqueous phase.

The proportion of the organic phase relative to the aqueous phase may vary over broad limits. The organic phase may thus constitute from 5% to 66% by volume of the two phases, preferably from 33% to 66%, and even more preferably about 50%.

The organic phase is emulsified in the aqueous phase by agitation.

As the operations of electrolysis and extraction are concomitant, the process may be carried out in an agitated reactor with electrolytic compartments that are not separated.

The agitation makes it possible, not only to produce a homogeneous emulsion, but it also favors material transfer at the electrodes.

The agitation is preferably carried out by means of a rotating agitator, for example a blade agitator in all of its forms, an anchor or finger agitator, etc., an inclined blade, helical or a turbine agitator, and the like.

The conditions of agitation must be relatively vigorous. The velocity of the agitation depends on the type of the agitator and the ratio of the diameter of the agitator to that of the reactor. As one example, the velocity of the agitator ranges from 400 to 2,000 rpm and preferably from 600 to 1,200 rpm, for an agitator having a diameter equal to 0.4 times the diameter of a reactor of 9 cm diameter (useful volume=750 cm$^3$).

Following the emulsifying of the organic phase in the aqueous phase, the electrolysis of the aqueous acid solution of cerous sulfate is carried out according to the invention under the following conditions.

The electrolysis is preferably carried out at ambient temperature, most typically ranging from 15° to 25° C. It is possible to conduct the operation at a higher temperature, which favors the kinetics of the electrochemical reaction and the material transfer at the electrodes, but the choice of temperature is limited by the solubility of the cerous sulfate, which decreases with increasing temperatures.

An anodic potential is defined at the limit of the oxygen evolution potential. Generally, it is removed by at least 50 millivolts from said potential. This depends on the medium and the electrodes. In the case of platinized titanium electrodes, the anodic potential is defined at 1.7 to 1.8 volts relative to the standard hydrogen electrode.

The density of the initial current depends on the cerous sulfate concentration. It is at a maximum with maximum concentrations.

Concerning the electrode face surfaces, the anodic surface area must be greater than the cathodic surface in order to favor the evolution of hydrogen at the cathode.

The ratio of the anodic to the cathodic surface may range from 1.0 to 10, but preferably it ranges from 1.5 to 3.0, which requires a considered selection of the geometry of the electrodes.

Electrodes in the form of plates may be used, but a more porous structure, such as a sheet or grid of expanded metal, is preferred.

Concerning the nature of the electrodes, they must be of a material resistant to chemical and electrochemical oxidation.

The cathode may be of graphite or preferably of a metal, in particular titanium, or titanium coated with a precious metal, for example platinum, palladium or iridium.

The anode may be made of titanium, or titanium coated with a precious metal such as platinum, palladium or iridium.

In view of the fact that the reaction medium is preferably agitated by central agitation means, it is particularly advantageous to constitute the two electrodes in the form of an annulus centered around the agitator.

Finally, it will be appreciated that in the process of the invention it is desirable to reduce the transfer of material at the cathode. For this reason, the electrodes are preferentially situated in the reactor in a manner such that the cathode is disposed against the lateral walls of the reactor.

The duration of the electrolysis may continue until an equilibrium is reached, which is indicated by a constant potential, intensity and concentration.

Upon completion of the electrolysis, an organic phase highly charged with cerium 4+ is recovered; it is separated from the aqueous phase by any appropriate means, in particular decantation.

According to the process of the invention, a very high conversion proportion of cerium 3+ into cerium 4+ is realized, which may be as high as 95%.

The anodic current yield is higher than 99%. The "Faraday" yield of the cell is higher than 99% at the onset of the electrolysis and approximately 90% at equilibrium.

After the separation of the aqueous phase and the organic phase, it is possible to back-extract the cerium 4+ into an aqueous phase by contacting the organic phase with an acid aqueous solution, such as an aqueous solution of sulfuric acid.

The concentration of the aqueous solution of sulfuric acid preferably ranges from 5 to 10 N.

The process of the invention is particularly advantageous, because it may be used to recover the cerium contained in effluents or to separate cerium from other rare earths, beginning with a sulfuric solution thereof.

By the expression "rare earth" are intended the lanthanides having atomic numbers of from 57 to 71, inclusive, and yttrium which has an atomic number of 39.

The aqueous solution of rare earths from which the cerium is to be separated, may be obtained over the course of the treatment of minerals containing rare earths, such as monazite, bastnaesite.

In order to further illustrate the present invention and the advantages thereof, the following specific examples are given, it being understood that same are intended only as illustrative and in nowise limitative.

EXAMPLE 1:

This example, illustrating the process of this invention, was carried out in the apparatus shown in the attached Figures of Drawing.

The operations of formation of the emulsion and of the electrolysis were carried out in the same vessel 1, which functioned as a closed reactor.

The total volume of liquid was 0.750 liter.

Figure 2:
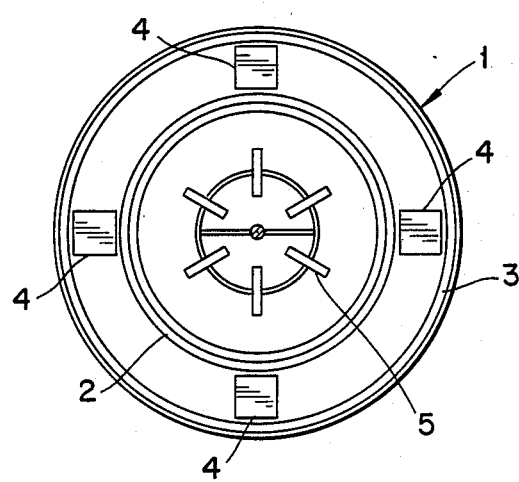
FIG. 2 is a top view of the electrolytic cell shown in FIG. 1.

Both of the electrodes were expanded titanium, galvanically plated with platinum and were of a circular configuration, as shown in FIG. 2.

The surface area of the anode 2 was 0.0734 m$^2$ and that of the cathode 3, 0.0496 m$^2$, providing an electrode surface area ratio of anode/cathode of 1.48.

Central agitation was carried out by means of a blade agitator, with the blades 5 rotating at 800 rpm.

The distance between the anode and the cathode was 9 mm and was maintained by four polypropylene supports 4 regularly distributed in the interspace between the anode and the cathode.

In the following experiment, the aqueous phase was 0.5 liter of a cerous sulfate solution containing 0.1 mole/l cerium 3+ and had a sulfuric acid normality of 1 N.

The organic phase, 0.25 l, comprised di(2-ethylhexyl)phosphoric acid in solution in kerosene, at a concentration of 0,8 mole/liter.

The organic phase was emulsified in the aqueous phase by agitation. The amount of organic phase in the emulsion was 33% by volume.

The electrochemical oxidation of cerium 3+ to cerium 4+ was carried out at ambient temperature, under a potential of 1.78 volts/ENH.

The electrolysis was conducted for 60 min.

The organic phase was enriched in cerium 4+ values. The results obtained were as follows:

At equilibrium: [Ce$^{3+}$] in aqueous phase=0.0146 mole/l;

Degree of conversion: 85.4%;

[Ce$^{4+}$] in aqueous phase=0.0079 mole/l;
[Ce$^{4+}$] in organic phase=0.155 mole/l;
Cerium fraction recovered in the organic phase:
Partition coefficient of Ce$^{4+}$ between the two phases: 20.

EXAMPLE 2:

Example 1 was repeated, except that the volume of the two phases was: 0.25 l of the aqueous phase and 0.5 l of the organic phase, i.e., a content of organic phase in the emulsion of 66%.

The results obtained were the following:

At equilibrium: [Ce$^{3+}$] in the aqueous phase=0.0044 mole l;

Degree of conversion: 95.6%;
[Ce$^{4+}$] in aqueous phase=0.38×10$^{-3}$ mole/l;
[Ce$^{4+}$] in organic phase=0.0476 mole/l;
Cerium fraction recovered in the organic phase: 95.2%;
Partition coefficient of Ce$^{4+}$ between the two phases: 125;
Current yield at equilibrium: 88%.

It will be seen from this example that increasing the amount of the organic phase increased the degree of conversion of the cerium 3+ and that, further the current yield at equilibrium was higher, even though the operation was carried out in a closed reactor.

EXAMPLE 3:

In this example, an aqueous phase comprising 0.375 liter of a cerous sulfate solution containing 0.2 mole/liter of cerium 3+ and having an sulfuric acid normality of 1 N, and a 0.375 liter organic phase containing 1.2 moles/liter of di(2-ethylhexyl)phosphoric acid per liter of kerosene, were mixed together; the amount of organic phase in the emulsion was 50%.

The operating conditions were those of Example 1.

The following results were obtained: At equilibrium:
[Ce$^{3+}$] in aqueous phase=0.0042 mole/l;
Degree of conversion: 98%;
[Ce$^{4+}$] in aqueous phase=0.0048 mole/l;
[Ce$^{4+}$] in organic phase=0.191 mole/l;
Cerium fraction recovered in the organic phase: 95.5%;
Partition coefficient of Ce$^{4+}$ between the two phases: 40. It will be seen that the degree of conversion was very high.

EXAMPLE 4:

In this example, an aqueous phase comprising 0.5 liter of a cerous sulfate solution containing 0.2 mole/liter cerium 3+ and having a sulfuric acid normality of 2 N, was contacted with a 0.25 liter organic phase containing 2 moles/liter di-(2-ethylhexyl)phosphoric acid per liter of kerosene; the amount of organic phase in the emulsion was 33%.

The operating conditions were those of Example 1.

The following results were obtained: At equilibrium:
[Ce$^{3+}$] in aqueous phase=0.0126 mole/l;
Degree of conversion: 93.7%;
[Ce$^{4+}$] in organic phase=0.353 mole/l;
Cerium fraction recovered in the organic phase: 88.2%.
Partition coefficient of Ce$^{4+}$ between the two phases: 32.

It will be seen that, by the process of the invention, an organic solution concentrated in cerium 4+ was produced.

COMPARATIVE EXAMPLE 5:

For purposes of comparison, the electrochemical oxidation of cerium 3+ to cerium 4+ was carried out in a conventional electrolytic cell without separators, fitted with the electrodes described in Example 1.

0.85 liter of an aqueous solution of cerous sulfate, containing 0.1 mole/liter of cerium 3+ and having a sulfuric acid normality of 1 N, was electrolyzed.

A potential of 1.78 volts/ENH was applied to the anode.

The following results were obtained: At equilibrium:
[$Ce^{3+}$]=0.077 mole/l;
[$Ce^{4+}$]=0.023 mole/l;
Degree of conversion: 23%.

Notable were the poor performance of such an electrolysis and the advantage provided by the invention, namely, the appreciable improvement in the degree of conversion, when the cerium 4+ is simultaneously extracted into the organic phase.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the conversion of cerous 3+ values into ceric 4+ values, which comprises providing a zone of electrolysis which includes an anode and a cathode emulsifying an organic phase comprising a cerium 4+ extractant in an aqueous sulfuric phase comprising the cerium 3+ values to be converted; simultaneously in said zone of electrolysis, electrolytically oxidizing said cerium 3+ values into cerium 4+ values and extracting said cerium 4+ values thus formed into said organic phase; separating the resulting emulsified organic phase and aqueous sulfuric phase into an aqueous phase and an organic phase enriched in cerium 4+ values; and recovering said organic phase enriched in cerium 4+ values.

2. The process as defined by claim 1, said aqueous sulfuric phase comprising a cerous sulfate phase comprising a cerous sulfate solution at a concentration of from 0.05 mole/liter to the saturation concentration of the cerous sulfate.

3. The process as defined by claim 1, comprising adding sulfuric acid to said aqueous phase in an amount such as to adjust the normality thereof to from 0.5 N to 5 N.

4. The process as defined by claim 3, comprising adjusting the normality to from 1 N to 2 N.

5. The process as defined by claim 1, said cerium 4+ extractant comprising a cationic extraction agent.

6. The process as defined by claim 5, said cerium 4+ extractant comprising an organophosphorus compound having one of the general formulae:

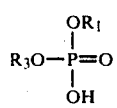

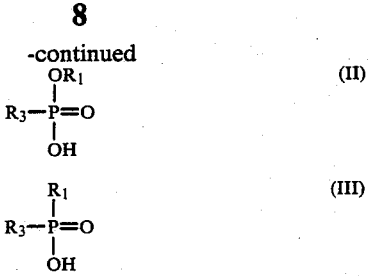

wherein $R_3$ represents $R_2$ or a hydrogen atom and $R_1$ and $R_2$ are aliphatic, cycloaliphatic or aromatic hydrocarbon radicals, or combinations thereof, having from 1 to 18 carbon atoms, at least one of such radicals containing at least 4 carbon atoms.

7. The process as defined by claim 6, said organophosphorus compound comprising a mono- or dialkylphosphoric acid, a mono- or dialkylphosphonic acid, an alkylphenylphosphonic acid, or a mono- or dialkylphosphinic acid.

8. The process as defined by claim 7, said organophosphorus compound comprising di(2-ethylhexyl)-phosphoric acid or di(2-ethylhexyl)phosphonic acid.

9. The process as defined by claim 1, said organic phase comprising a diluent selected from among an aliphatic or cycloaliphatic hydrocarbon, a halogenated hydrocarbon, or admixture thereof.

10. The process as defined by claim 9, said diluent comprising a petroleum fraction of a kerosene type.

11. The process as defined by claim 9, said organic phase comprising from 5% to 66% of the total volume of the organic phase and the aqueous sulfuric phase.

12. The process as defined by claim 1, comprising emulsifying said organic phase in the aqueous sulfuric phase by agitation.

13. The process as defined by claim 1, comprising conducting said electrolyte oxidizing step at ambient temperature.

14. The process as defined by claim 1, wherein the anodic potential of said electrolytic oxidizing step is at the limit of its oxygen evolution potential.

15. The process as defined by claim 1, wherein, in said zone of electrolysis, the ratio of the anode surface area to the cathode surface area ranges from 1.0 to 10.

16. The process as defined by claim 15, said ratio ranging from 1.5 to 3.0.

17. The process as defined by claim 1, said anode and cathode comprising a porous shaped article.

18. The process as defined by claim 17, said anode and cathode comprising a sheet or grid of an expanded metal.

19. The process as defined by claim 1, said cathode comprising graphite, titanium or titanium coated with a precious metal and said anode comprising titanium or titanium coated with a precious metal.

20. The process as defined by claim 19, both said cathode and said anode comprising platinized titanium.

21. The process as defined by claim 20, comprising slowing the transfer of material at said cathode.

22. The process as defined by claim 1, comprising back-extracting said cerium 4+ values into an aqueous acid solution by contacting said organic phase enriched in cerium 4+ values with said aqueous acid solution.

23. The process as defined by claim 22, said aqueous acid solution comprising an aqueous solution of sulfuric acid having a normality ranging from 5 to 10 N.

24. The process as defined by claim 1, said aqueous sulfuric phase comprising rare earth metals from a treatment process of a rare earth mineral.

* * * * *